United States Patent
Casper et al.

(10) Patent No.: US 12,431,346 B2
(45) Date of Patent: Sep. 30, 2025

(54) MEMBRANE-BASED PURGE GAS AND SAMPLE TRANSFER FOR LASER ABLATION SAMPLE PROCESSING

(71) Applicant: Elemental Scientific, Inc., Omaha, NE (US)

(72) Inventors: Mark Casper, Blair, NE (US); Ross Coenen, Omaha, NE (US); Michael P. Field, Papillion, NE (US); Daniel R. Wiederin, Omaha, NE (US); Jude Sakowski, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 207 days.

(21) Appl. No.: 18/184,236

(22) Filed: Mar. 15, 2023

(65) Prior Publication Data

US 2023/0298877 A1    Sep. 21, 2023

Related U.S. Application Data

(60) Provisional application No. 63/319,846, filed on Mar. 15, 2022.

(51) Int. Cl.
*H01J 49/04* (2006.01)
*G05D 7/06* (2006.01)
*H01J 49/10* (2006.01)

(52) U.S. Cl.
CPC ........ *H01J 49/0463* (2013.01); *H01J 49/105* (2013.01); *G05D 7/0617* (2013.01)

(58) Field of Classification Search
CPC ... H01J 49/0463; H01J 49/105; H01J 49/0404
See application file for complete search history.

(56) References Cited

U.S. PATENT DOCUMENTS 10,497,550 B1 *  12/2019  Field ................... H01J 49/0422
10,811,242 B2    10/2020  Zarrine-Afsar et al.
(Continued)

FOREIGN PATENT DOCUMENTS

JP        2016519393 A       6/2016

OTHER PUBLICATIONS

PCT International Search Report and Written Opinion for PCT/US2023/015283, dated Jul. 3, 2023.

*Primary Examiner* — David E Smith
(74) *Attorney, Agent, or Firm* — Kevin E. West; Advent, LLP

(57) ABSTRACT

Systems and methods are described for transferring gas from an ablation cell to an inductively coupled plasma analysis system via a gas exchange membrane transfer line to exchange gas introduced to the ablation cell with a sweep gas. A system embodiment includes, but is not limited to, a laser ablation cell configured to generate a sample transfer stream through laser ablation of a sample and introduction of a carrier gas to flow the ablated sample from the laser ablation cell; an inductively-coupled plasma analysis device configured to measure one or more analytes in the sample transfer stream; and a gas exchange membrane transfer line fluidically coupled between the laser ablation cell and the inductively-coupled plasma analysis device, the gas exchange membrane transfer line configured to replace gas in the sample transfer stream with sweep gas via gas exchange across a membrane of the gas exchange membrane transfer line.

20 Claims, 4 Drawing Sheets

(56) References Cited

U.S. PATENT DOCUMENTS

| | | |
|---|---|---|
| 2016/0260598 A1 | 9/2016 | Loboda et al. |
| 2018/0220520 A1* | 8/2018 | Alavi .................. G01J 3/443 |
| 2021/0404968 A1* | 12/2021 | Loboda ................ H05H 1/30 |
| 2023/0039261 A1* | 2/2023 | Bryden ................ H01J 49/04 |

* cited by examiner

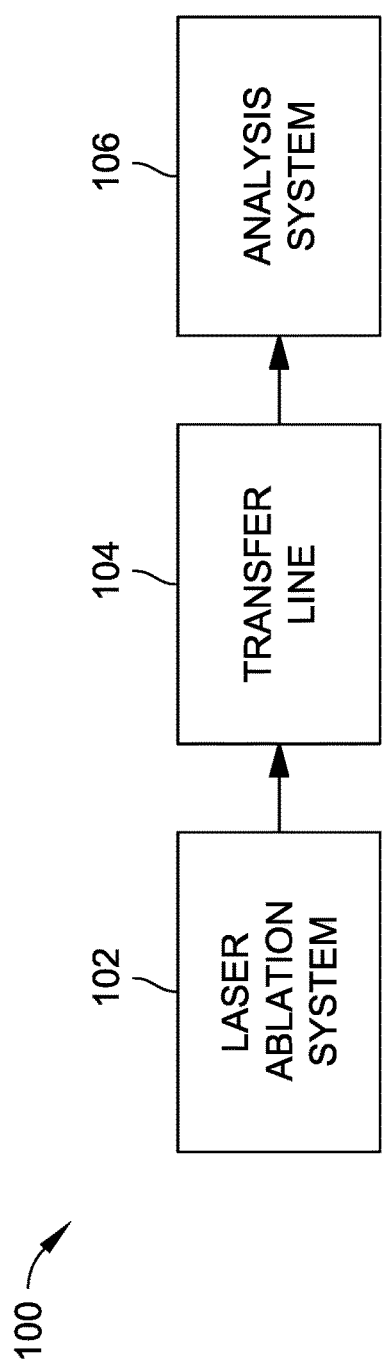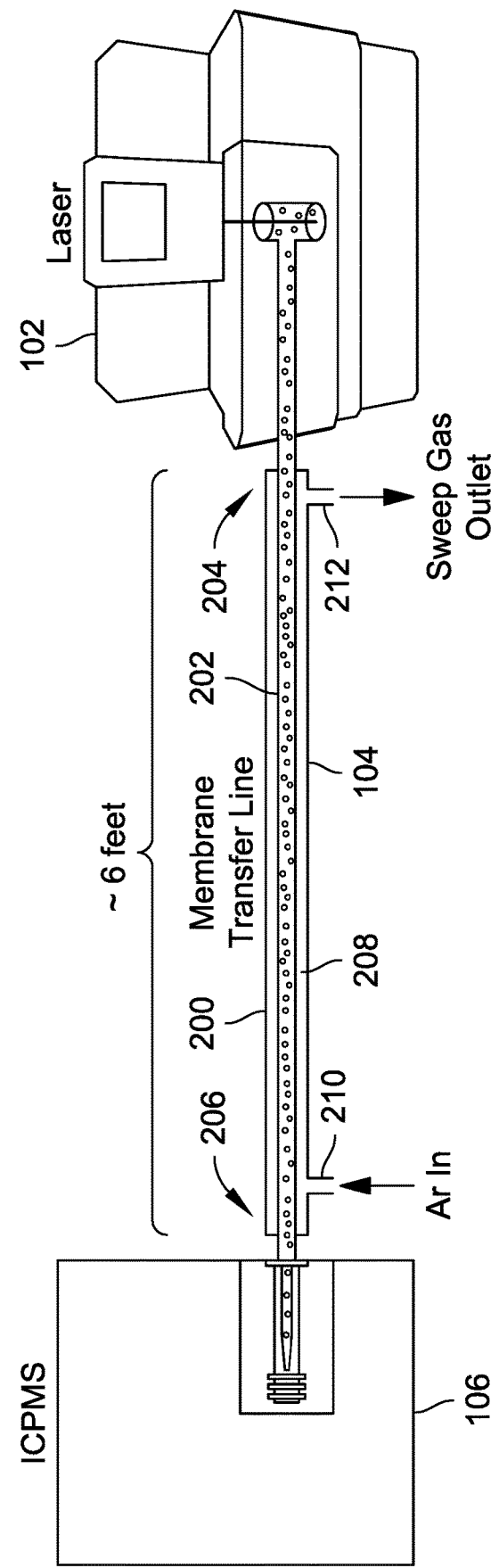

MEMBRANE-BASED PURGE GAS AND SAMPLE TRANSFER FOR LASER ABLATION SAMPLE PROCESSING

CROSS-REFERENCE TO RELATED APPLICATIONS

The present application claims the benefit of 35 U.S.C. § 119(e) of U.S. Provisional Application Ser. No. 63/319,846, filed Mar. 15, 2022, and titled "MEMBRANE-BASED PURGE GAS AND SAMPLE TRANSFER FOR LASER ABLATION SAMPLE PROCESSING." U.S. Provisional Application Ser. No. 63/319,846 is herein incorporated by reference in its entirety.

BACKGROUND

Laser Ablation Inductively Coupled Plasma Mass Spectrometry (LA-ICPMS) and Laser Ablation Inductively Coupled Plasma Optical Emission Spectrometry (LA-ICP-OES) techniques can be used to analyze the composition of a target, such as a solid or liquid target material. Often, a sample of the target is provided to an analysis system in the form of an aerosol (i.e., a suspension of solid and possibly liquid particles and/or vapor in a carrier gas, such as helium gas). The sample is typically produced by arranging the target within a laser ablation chamber, introducing a flow of a carrier gas within the chamber, and ablating a portion of the target with one or more laser pulses to generate a plume containing particles and/or vapor ejected or otherwise generated from the target, suspended within the carrier gas. Entrained within the flowing carrier gas, the target material is transported to an analysis system via a transport conduit to an inductively coupled plasma (ICP) torch where it is ionized.

A plasma containing the ionized particles and/or vapor is then analyzed by an analysis system, such as a mass spectrometry (MS), optical emission spectrometry (OES), isotope ratio mass spectrometry (IRMS), or electro-spray ionization (ESI) system. For example, ICP spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

SUMMARY

Systems and methods are described for transferring sample gas from an ablation cell to an inductively coupled plasma analysis system via a gas exchange membrane transfer line to exchange gas introduced to the ablation cell with a sweep gas, without extinguishing a plasma used by the analysis system for measuring analytes in the sample gas. A system embodiment includes, but is not limited to, a laser ablation cell configured to generate a sample transfer stream through laser ablation of a sample and introduction of a carrier gas to flow the ablated sample from the laser ablation cell; an inductively-coupled plasma analysis device configured to measure one or more analytes in the sample transfer stream; and a gas exchange membrane transfer line fluidically coupled between the laser ablation cell and the inductively-coupled plasma analysis device, the gas exchange membrane transfer line configured to replace gas in the sample transfer stream with sweep gas via gas exchange across a membrane of the gas exchange membrane transfer line.

A method embodiment includes, but is not limited to, transferring a sample transfer stream containing a plurality of sample particles and at least one gas from a laser ablation system to a gas exchange membrane transfer line; introducing a sweep gas to the gas exchange membrane transfer line; separating at least a portion of the at least one gas from the plurality of sample particles via exchange with at least a portion of the sweep gas; and transferring the sample transfer stream through the gas exchange membrane transfer line to an inductively-coupled plasma analysis device.

A system embodiment includes, but is not limited to, a laser ablation system configured to generate a sample transfer stream through laser ablation of a sample and introduction of a carrier gas to flow the ablated sample from the laser ablation system; an inductively-coupled plasma analysis device configured to measure one or more analytes in the sample transfer stream; and a gas exchange membrane transfer line fluidically coupled between the laser ablation system and the inductively-coupled plasma analysis device, the gas exchange membrane transfer line configured to replace gas in the sample transfer stream with sweep gas via gas exchange across a membrane of the gas exchange membrane transfer line.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

FIG. 1 is a diagrammatic illustration of a system for controlling flow of a purge gas introduced to an ablation cell between samples, in accordance with example implementations of the present disclosure.

FIG. 2 is a schematic of a gas exchange membrane coupled between a laser ablation system and an analytic system to replace sample gases or purge gases with a sweep gas, in accordance with example implementations of the present disclosure.

DETAILED DESCRIPTION

Overview

Figure 3:
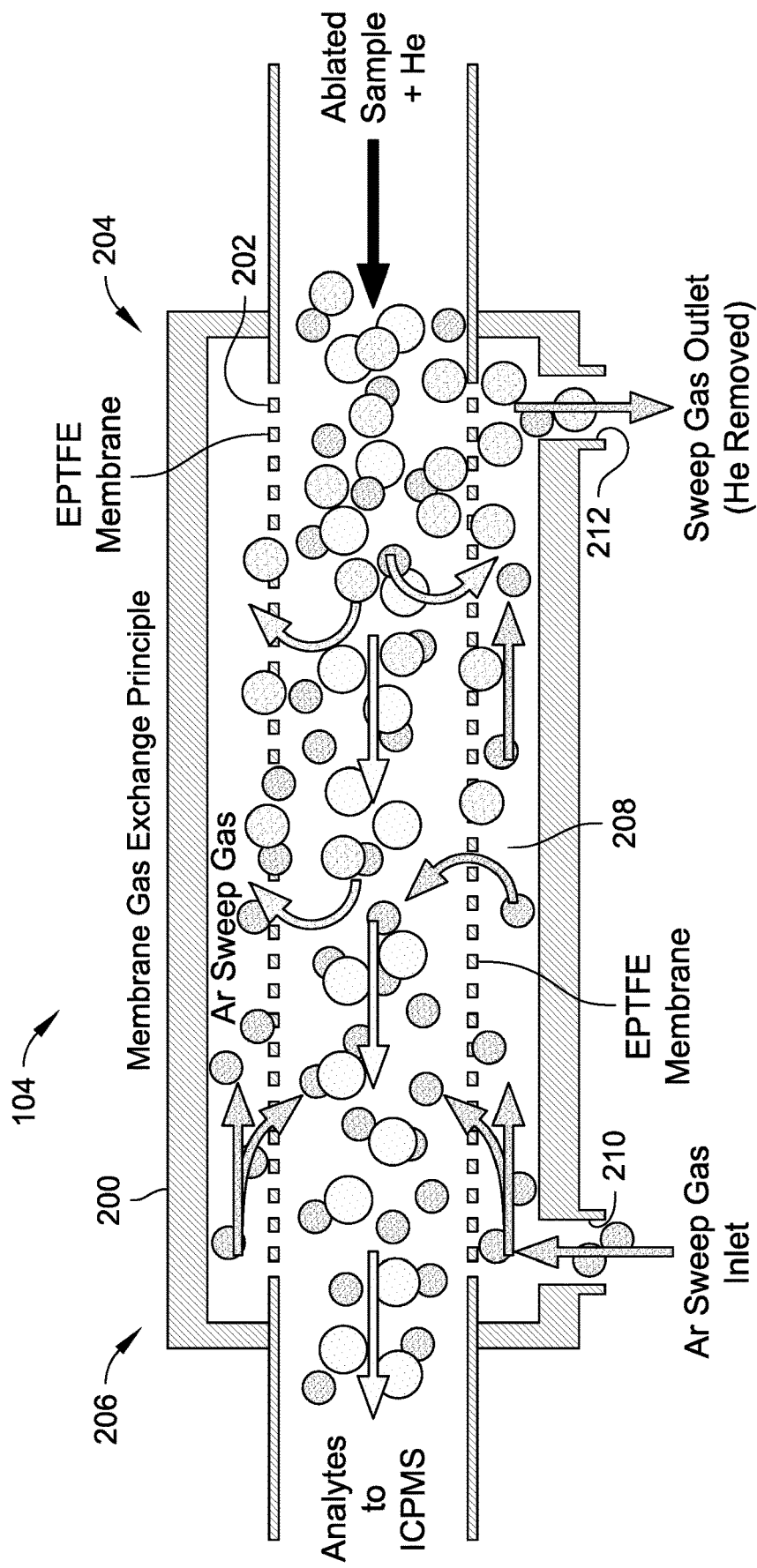
FIG. 3 is a diagrammatic illustration of the gas exchange membrane of FIG. 2 during a gas exchange procedure.

Laser ablation is a sampling method which uses a focused beam of pulsed laser light in a laser ablation cell to convert a portion of a solid or liquid sample from a target object into aerosol phase which is transported on a gas stream into an analyzer, such as an Inductively-Coupled Plasma Mass Spectrometer (ICPMS). Multiple laser pulses may be used to ablate different areas of the sample to produce adequate signal and to ensure that a representative sample has been collected for analysis.

Laser ablation systems can utilize automated sample loading techniques to facilitate automated handling of multiple samples for a single laser ablation cell. For example, the laser ablation system can include a sample loading system (e.g., a sample carousel) to house multiple samples and to serially introduce the samples to the laser ablation cell to generate individual ablated samples. For example, the sample carousel can rotate to bring a given sample into proximity beneath a laser ablation cell. A piston positioned beneath the carousel can vertically lift a given sample into or against the laser ablation cell and hold the sample in position during laser ablation sampling. After transfer of the ablated target material from the laser ablation cell to the analyzer, the piston can lower the sample, where the carousel positions the next sample into proximity beneath the laser ablation cell. During changeover between samples, atmospheric gas can enter an exposed laser ablation cell, such as where lowering of the piston exposes a bottom portion of the laser ablation cell to the atmosphere or entrained atmospheric gases present within the laser ablation system. If the atmospheric gas were sent to the analyzer, the plasma of the ICP torch could be extinguished, causing downtime of the ICP analyzer during subsequent reigniting the ICP torch and performing any recalibration or stabilization techniques, which in turn reduces sample throughput and increases costs for operation of the ICP analyzer (e.g., due to increased nebulizer gas usage, power requirements, and the like).

One option to prevent atmospheric gas from entering the ICP torch is to utilize a pinch valve to selectively choose a pathway for gas from the laser ablation cell to follow. For example, a transfer line from the laser ablation cell can split into two gas lines made of pliable/flexible material and enter a pinch valve. The first gas line connects the laser ablation cell with the ICP torch and the second gas line connects the laser ablation cell with a purge location (e.g., vent, waste, etc.). During changeover between samples, the pinch valve pinches closed the first gas line by compressing the flexible tubing to prevent atmospheric gas from reaching the ICP torch, while the second gas line remains open to purge the atmospheric gas. During sampling, the pinch valve opens the first gas line and pinches closed the second gas line by compressing the flexible tubing to prevent sample gas from being purged while permitting sample to pass through the first gas line to the ICP torch.

However, pinch valves introduce many drawbacks to operation of a laser ablation system due to frequent changing of the internal diameter of the tubing that passes between the laser ablation cell and the ICP analyzer. For instance, the opening and closing operation of the pinch valves can be unreliable, due to sticking of the flexible tubing between opening/closing operations (e.g., the tube interior walls stick to themselves), due to deformation of the flexible tube over time (e.g., stiffening of the flexible tube material), or other reasons. Sticking of the tubing or other tube deformation can increase over time due to mechanical failure or aging of the tubing. Additionally, the tubing can be prone to clogging, where sample or atmospheric particulates can build at the pinch sites, which can affect the consistency of sample analysis by the ICP analyzer and require frequent tube maintenance or replacement, oftentimes noticeable only after perceived sample procedure failures, which can lead to reprocessing of the sample after tube maintenance and the associated time loss therewith. Such mechanical issues with the pinch valves can result in variable cell pressure of the laser ablation cell during sample processing and variable sensitivity of the ICP analyzer to measure analytes in the sample gas transferred from the laser ablation cell, among other issues.

Accordingly, in one aspect, the present disclosure is directed to systems and methods for transferring gas from a laser ablation system to an inductively coupled plasma analysis system via a gas exchange membrane transfer line to exchange gas introduced to the laser ablation system with a sweep gas, without extinguishing a plasma used by the analysis system for measuring analytes in the sample gas. The gas exchange membrane transfer line is fluidically coupled between the laser ablation system (or a portion thereof, such as if a laser ablation cell is utilized) and the analysis system and includes a tube formed from a gas exchange membrane (e.g., a polytetrafluoroethylene (PTFE) membrane) that is housed within an outer tube. A sweep gas (e.g., Ar gas) is introduced to one end of the transfer line into the annular space between the tubes. The sample transfer stream is introduced to the interior of the gas exchange membrane tube at an end of the transfer line opposite from the introduction of the sweep gas, such that the sweep gas and sample transfer stream flow in opposite directions. In implementations, the flow rate of the sweep gas can be controlled by a mass flow controller (MFC).

Gases present in the sample transfer stream pass through the membrane into the annual space between the tubes (e.g., due to equilibrium forces) and eventually are removed from the transfer line for subsequent disposal through an exhaust. The sweep gas (e.g., supplied via MFC), passes from the annular space, through the membrane, and into the sample transfer stream. The sample transfer stream therefore has all or substantially all prior gases (e.g., nitrogen gas, purge gas, atmospheric gas, etc.) replaced with sweep gas (e.g., Ar) prior to transfer of the sample transfer stream into the analytic system. This allows for a purge gas to be added to the ablation cell and have the entire flow path be purged without needing a physical clamp or restriction on the system.

Example Implementations

Referring generally to FIGS. 1 through 5, systems 100 are shown for transferring gas from a laser ablation system to an inductively-coupled plasma analysis system via a gas exchange membrane transfer line to exchange gas introduced to the laser ablation system with a sweep gas, in accordance with example implementations of the present disclosure. The system 100 generally includes a laser ablation system 102 in fluid communication with each of a gas exchange membrane transfer line ("transfer line 104") and an analysis system 106. The laser ablation system 102 can include a laser ablation cell or other chamber holding a sample while a focused beam of pulsed laser light converts a portion of the sample into aerosol phase which is transported on a gas stream into the transfer line 104. The transfer line 104 introduces a sweep gas to exchange with gases used by the laser ablation system 102 to transfer sample from the laser ablation system or to purge atmosphere introduced during sample changeover. The flow of material through the transfer line 104 from the laser ablation system 102 to the analysis system 106 is referred to herein as a "sample transfer stream," where the composition of the sample transfer stream can change over the length of the transfer line 104 as the sweep gas exchanges with the gases present in the laser ablation system (e.g., carrier gas, atmospheric gas, purge gas, etc.). Example gases present in the laser ablation system during sample transfer or purge cycles include, but are not limited to, helium, nitrogen, carbon dioxide, oxygen, and the like. An example sweep gas includes, but is not limited to, argon. As such, the sample transfer stream can include varying compositions of ablated sample, carrier gas, atmospheric gas, purge gas, and sweep gas as the sample is transferred to analysis system 106, where more sweep gas replaces gases transferred from the laser ablation system 102 as the sample transfer stream travels through the transfer line 104. The transfer line 104 also fluidically couples the laser ablation system 102 with the analysis system 106, which in implementations is an inductively-coupled plasma analysis system, such as an ICP-MS system, an ICP-OES, or the like, used to measure one or more analytes in the sample transfer stream.

The transfer line 104 is shown in FIGS. 2 and 3 including an outer tube 200 formed from a gas impermeable material surrounding an inner tube 202 constructed from a gas exchange membrane material. In implementations, the gas exchange membrane material is a polytetrafluoroethylene (PTFE) membrane, however the transfer line 104 is not limited to such material and could include alternative or additional materials suitable for sweep gas replacement while being substantially impermeable to sample particulates. The sample transfer stream is introduced from the laser ablation system 102 into the interior of the inner tube 202 at a first end 204 of the transfer line 104 and is transferred through the transfer line 104 to a second end 206 of the transfer line 104 that is fluidically coupled with the analysis system 106. The sweep gas is introduced into an annular region 208 between the outer tube 200 and the inner tube 202 and is transferred through the transfer line 104 towards the first end 204. In implementations, the sweep gas is introduced to the transfer line 104 via a sweep gas inlet 210 that is adjacent the second end 206 of the transfer line 104 and is removed from the transfer line 104 via a sweep gas outlet 212 that is adjacent the first end 204 of the transfer line 104. However, for longer transfer lines 104 (e.g., transfer lines in excess of six feet), the sweep gas inlet 210 could be positioned away from the second end 206 and closer to the middle of the transfer line 104, where the length of the transfer line 104 ensures that sufficient residence time is provided for the sweep gas to exchange into the sample transfer stream. In implementations, the flow rate of the sweep gas is managed by a mass flow controller (MFC) for introduction into the sweep gas inlet 210 at a precisely controlled flow rate.

While the transfer line 104 is described herein as including a substantially concentric arrangement of the inner tube 202 and the outer tube 200 to provide the annular region 208 therebetween, the instant disclosure is not limited to such a configuration for the transfer line 104. For example, the inner tube 202 and the outer tube 200 could be offset such that the region therebetween is an irregular shape (i.e., not annular), one or more of the inner tune 202 or the outer tube 200 could have a non-circular cross-section, or the like, without departing from the scope of the instant disclosure.

The sweep gas and the sample transfer stream flow through the transfer line 104 in substantially opposite directions with the inner tube 202 initially separating the flows. For instance, the inner tube 202 separates the annular region 208 that initially holds the sweep gas from the interior of the inner tube 202 into which the sample transfer stream flows. The PTFE membrane of the inner tube 202 is substantially permeable with respect to gases (e.g., sweep gas (e.g., Ar), sample transfer gas (e.g., He), purge gas (e.g., $N_2$), etc.) and substantially impermeable to sample particulates produced from the laser ablation system 102. As such, portions of the sweep gas flow from the annular region 208 across the membrane and into the interior of the inner tube 202 to mix with the sample transfer stream for passage to the analysis system 106, whereas portions of gases initially present in the sample transfer stream flow from the inner tube 202 across the membrane and into the annular region 208 for passage out the sweep gas outlet 212. For example, FIG. 3 shows an implementation where helium gas initially present in the sample transfer stream is transferred from the inner tube 202 across the membrane into the annular region 208 and argon sweep gas is transferred from the annular region 208 across the membrane and into the inner tube 202 to mix with the sample transfer stream for passage to the analysis system 106. As shown, substantially all of the helium initially present in the sample transfer stream is removed from the sample transfer stream and output from the transfer line 104 via the sweep gas outlet 212. For instance, the concentration of sweep gas in the annular region 208 can drive exchange of the sample transfer stream gas, such that the helium gas is exchanged with the argon sweep gas over the length of the transfer line 104. In implementations, the removal of initial sample transfer stream gas via the transfer line 104 is over 99%.

The length of the transfer line 104 can affect the amount or extent of gas exchange between gases flowing through the inner tube 202 and the annular region 208. In implementations, the transfer line 104 having a length of about six feet was shown experimentally to replace substantially all (e.g., 99% or greater replacement) of the initial gases in the sample transfer stream with sweep gas. However, the system 100 is not limited to a transfer line 104 of about six feet, where the system 100 can include transfer lines 104 exceeding six feet or transfer lines less than six feet, where such length can depend on, for example, the amount of gas exchange desired, the flow rates of the gas streams, the type of gas exchange membrane, or other factors.

Since the sample transfer stream gases can be replaced with sweep gas, the system 100 can introduce purge gases to the laser ablation system to purge any atmospheric gases present in the ablation cell due to changeover in samples without extinguishing the plasma of the ICP torch of the analysis system 106. Further, the system 100 can control the composition of gases in the sample transfer stream without use of a physical clamp or restriction on flow lines in the system 100, such as via a pinch valve, and can therefore maintain an open transfer line between the laser ablation system 102 and the analysis system 106.

Experimentation Example—Nitrogen Content in Sample Transfer Stream

In an implementation, the system 100 was utilized to measure the amount of nitrogen gas removed from the sample transfer stream via a transfer line 104 having a length of about six feet leading to the analysis system 106. In a first portion of the experiment, a plurality of nitrogen samples was introduced with differing rates of introduction controlled via a mass flow controller (MFC) to an ICPMS system, without an intervening gas exchange membrane (e.g., downstream of the gas exchange membrane), to quantitatively measure the amount of nitrogen received for various flow rates of nitrogen. Example nitrogen flow rates ranged from about 0.1 mL/min to about 1 mL/min.

Figure 4:
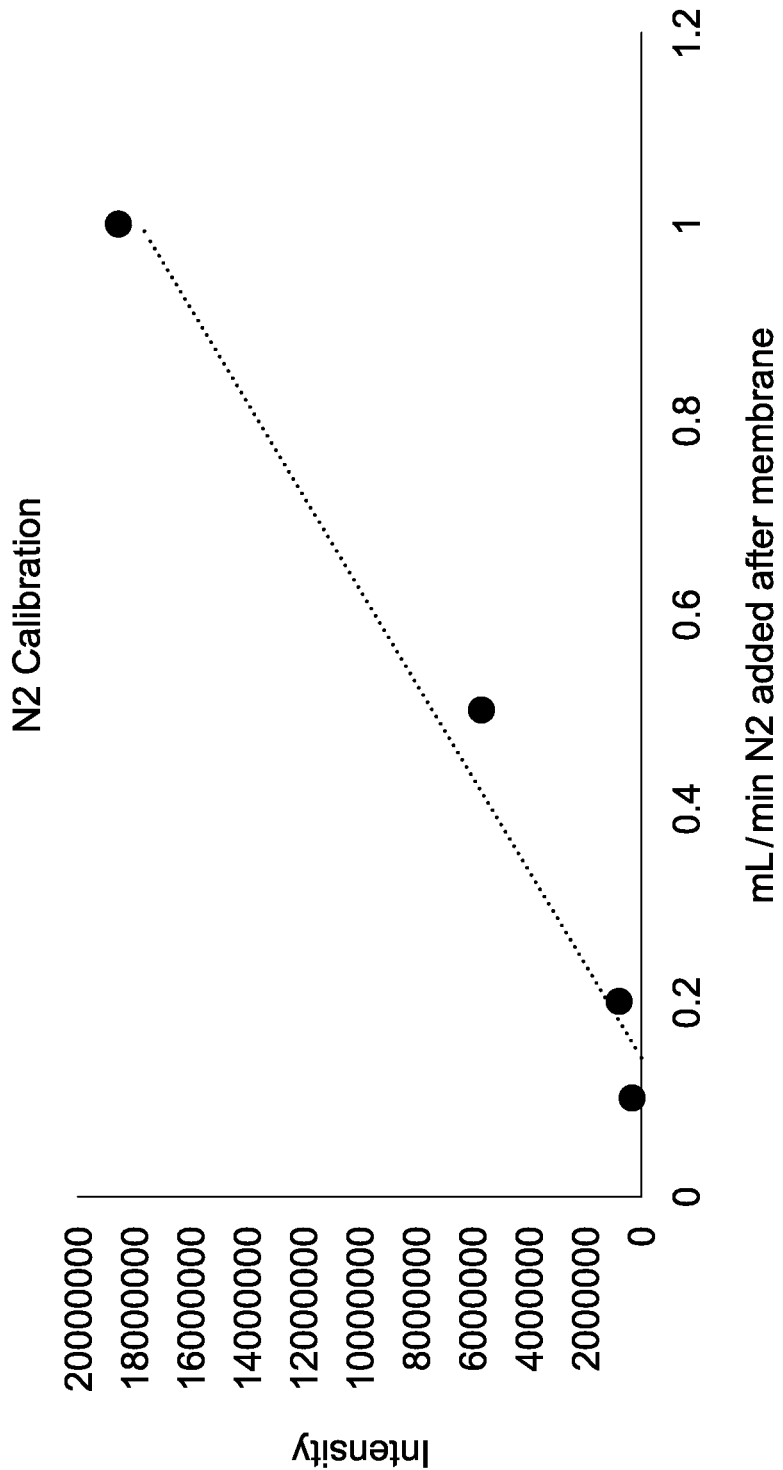
FIG. 4 is a graph of intensity of nitrogen vs amount of nitrogen added after the gas exchange membrane to provide a nitrogen calibration curve.

By introducing nitrogen to the ICPMS system without an intervening gas exchange membrane, all nitrogen introduced via the MFC was received by the ICPMS system, without effects of gas exchange via a gas exchange membrane in the transfer line 104. The ICPMS system reported the measured intensity of nitrogen. A calibration curve of intensity vs flow rate was established based on these measurements, an example of which is shown in FIG. 4.

In a next portion of the experiment, a plurality of nitrogen samples was introduced with differing flow rates controlled via the MFC through the transfer line 104 to the ICPMS. An intervening gas exchange membrane was present in the transfer line 104 between the introduction site of the nitrogen samples and the ICPMS. Example nitrogen flow rates ranged from about 600 mL/min to about 1500 mL/min. An argon sweep gas was introduced to the transfer line 104 to exchange the nitrogen introduced via the MFC with argon prior to reaching the ICPMS. The ICPMS system reported the measured intensity of nitrogen, representing the nitrogen that was not removed or otherwise exchanged by the transfer line 104 during transit to the ICPMS system.

Figure 5:
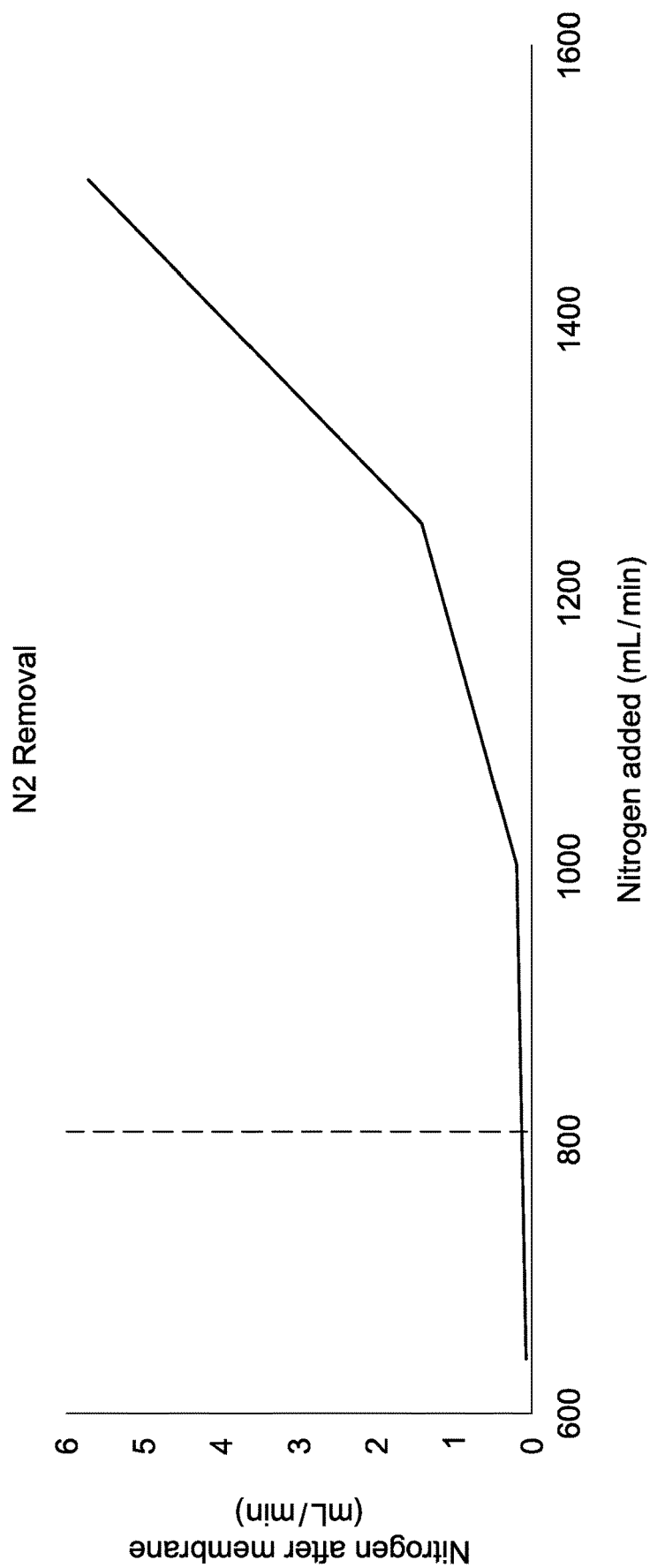
FIG. 5 is a graph of rate of nitrogen detected by an analysis system following gas exchange via the gas exchange membrane vs rate of nitrogen added prior to the gas exchange membrane.

A chart of nitrogen flow rate measured at the ICPMS after transferring through the transfer line 104 vs nitrogen flow rate introduced upstream of the transfer line 104 via the MFC was established based on these measured, an example of which is shown in FIG. 5. The calibration curve shown in FIG. 4 was utilized to obtain the y axis measurement data, where nitrogen intensities measured following gas exchange in the transfer line 104 were plotted on the calibration curve to determine the flow rate of nitrogen remaining after gas exchange. As can be seen from FIG. 5, the transfer line 104 provided a removal of more than 99% of nitrogen introduced to the transfer line 104 for a wide range of gas flow rates. For instance, for a nitrogen flow rate of 800 mL/min (shown with a vertical line on the chart), which is in the range of typical laser ablation sample gas flow rates, the ICPMS system measured less than 0.5 mL/min, resulting in a nitrogen gas removal of greater than 99.93%.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system for controlling flow of gas from a laser ablation cell, comprising:
   a laser ablation cell configured to generate a sample transfer stream through laser ablation of a sample and introduction of a carrier gas to flow the ablated sample from the laser ablation cell;
   an inductively-coupled plasma analysis device configured to measure one or more analytes in the sample transfer stream; and
   a gas exchange membrane transfer line fluidically coupled between the laser ablation cell and the inductively-coupled plasma analysis device, the gas exchange membrane transfer line configured to replace gas in the sample transfer stream with sweep gas via gas exchange across a membrane of the gas exchange membrane transfer line, wherein the gas exchange membrane transfer line has a length of at least six feet to replace substantially all the gas in the sample transfer stream with sweep gas prior to receipt by the inductively-coupled plasma analysis device.

2. The system of claim 1, further comprising:
   a mass flow controller fluidically coupled with a source of the sweep gas, the mass flow controller configured to introduce the sweep gas to an inlet of the gas exchange membrane transfer line at a controlled flow rate.

3. The system of claim 1, wherein the gas exchange membrane transfer line includes an inner tube surrounded by an outer tube, wherein at least a portion of the inner tube includes the gas exchange membrane.

4. The system of claim 3, wherein the outer tube defines an inlet configured to receive the sweep gas into a region defined between the inner tube and the outer tube.

5. The system of claim 4, wherein the region defined between the inner tube and the outer tube is an annular region.

6. The system of claim 4, wherein the inlet is positioned adjacent an end of the gas exchange membrane transfer line coupled with the inductively-coupled plasma analysis device such that the sweep gas and the sample transfer stream at least partially flow through the gas exchange membrane transfer line in an opposite flow path arrangement.

7. The system of claim 1, further comprising a sample carousel configured to hold a plurality of samples for serial introduction to the laser ablation cell for generation of an individual sample transfer stream from each respective sample.

8. A method for controlling flow of gas from a laser ablation cell, comprising:
   transferring a sample transfer stream containing a plurality of sample particles and at least one gas from a laser ablation system to a gas exchange membrane transfer line having a length of at least six feet;
   introducing a sweep gas to the gas exchange membrane transfer line;
   separating substantially all of the at least one gas from the plurality of sample particles via exchange with at least a portion of the sweep gas within the gas exchange membrane transfer line; and
   transferring the sample transfer stream through the gas exchange membrane transfer line to an inductively-coupled plasma analysis device.

9. The method of claim 8, wherein introducing a sweep gas to the gas exchange membrane transfer line includes introducing the sweep gas, via a mass flow controller, to the gas exchange membrane transfer line at a controlled flow rate.

10. The method of claim 8, wherein the gas exchange membrane transfer line includes an inner tube surrounded by an outer tube, wherein at least a portion of the inner tube includes a membrane permeable by the sweep gas and the at least one gas, the membrane substantially impermeable to the plurality of sample particles.

11. The method of claim 10, wherein introducing a sweep gas to the gas exchange membrane transfer line includes introducing the sweep gas to a region between the inner tube and the outer tube, and wherein transferring a sample transfer stream containing a plurality of sample particles and at least one gas from a laser ablation system to a gas exchange membrane transfer line includes transferring the sample transfer stream through the inner tube.

12. The method of claim 11, wherein at least a portion of the sweep gas and the sample transfer stream flow travel in opposite directions through the gas exchange membrane transfer line.

13. The method of claim 8, wherein separating at least a portion of the at least one gas from the plurality of sample particles via exchange with at least a portion of the sweep gas includes separating at least 99% of the at least one gas from the plurality of sample particles via exchange with at least a portion of the sweep gas.

14. A system for controlling flow of gas from a laser ablation system, comprising:
- a laser ablation system configured to generate a sample transfer stream through laser ablation of a sample and introduction of a carrier gas to flow the ablated sample from the laser ablation system;
- an inductively-coupled plasma analysis device configured to measure one or more analytes in the sample transfer stream; and
- a gas exchange membrane transfer line fluidically coupled between the laser ablation system and the inductively-coupled plasma analysis device, the gas exchange membrane transfer line configured to replace gas in the sample transfer stream with sweep gas via gas exchange across a membrane of the gas exchange membrane transfer line, wherein the gas exchange membrane transfer line has a length of at least six feet to replace substantially all the gas in the sample transfer stream with sweep gas prior to receipt by the inductively-coupled plasma analysis device.

15. The system of claim 14, further comprising:
- a mass flow controller fluidically coupled with a source of the sweep gas, the mass flow controller configured to introduce the sweep gas to an inlet of the gas exchange membrane transfer line at a controlled flow rate.

16. The system of claim 14, wherein the gas exchange membrane transfer line includes an inner tube surrounded by an outer tube, wherein at least a portion of the inner tube includes the gas exchange membrane.

17. The system of claim 16, wherein the inner outer tube defines an inlet configured to receive the sweep gas into a region defined between the inner tube and the outer tube.

18. The system of claim 17, wherein the region defined between the inner tube and the outer tube is an annular region.

19. The system of claim 18, wherein the inlet is positioned adjacent an end of the gas exchange membrane transfer line coupled with the inductively-coupled plasma analysis device such that the sweep gas and the sample transfer stream at least partially flow through the gas exchange membrane transfer line in an opposite flow path arrangement.

20. The system of claim 14, further comprising a sample carousel configured to hold a plurality of samples for serial introduction to the laser ablation system for generation of an individual sample transfer stream from each respective sample.

* * * * *